T. Blake,
Bushing for Journals.
N° 82,790. Patented Oct. 6, 1868.
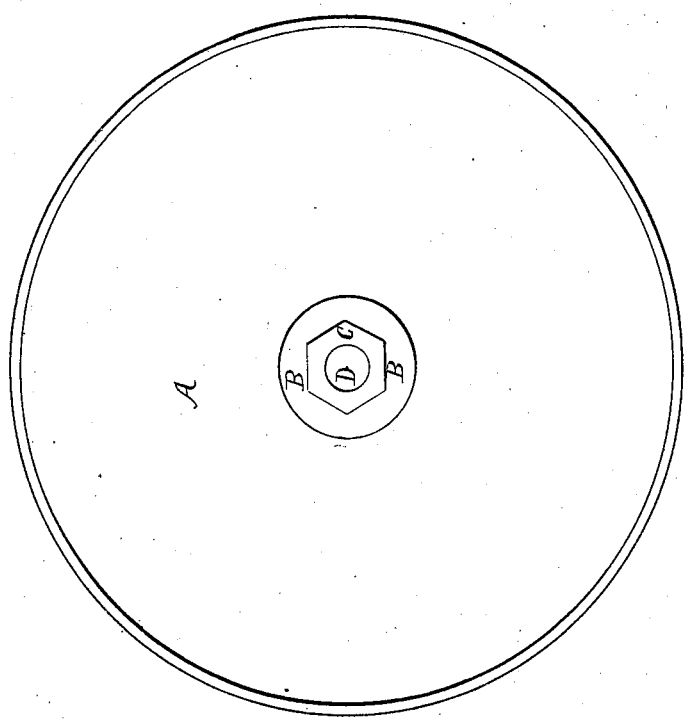
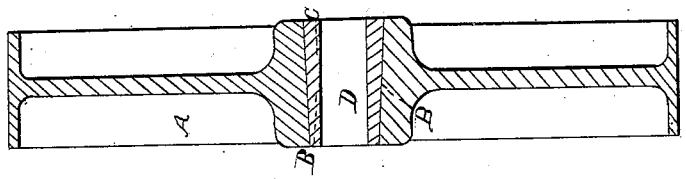
Witnesses.
Melville Cottle
W. E. Grimes
Inventor.
Thomas Blake

United States Patent Office.

THOMAS BLAKE, OF STOCKTON, CALIFORNIA.

Letters Patent No. 82,790, dated October 6, 1868.

IMPROVEMENT IN BUSHING FOR WHEELS.

*The Schedule referred to in these Letters Patent and making part of the same.*

TO ALL WHOM IT MAY CONCERN:

Be it known that I, THOMAS BLAKE, of the city of Stockton, county of San Joaquin, State of California, have invented a new and useful manner of Bushing the Hubs of Wheels which are required to run loose upon their axles, for agricultural or other machinery; and I do declare that the following is a full, clear, and exact description thereof, reference being had to the accompanying drawings, and to the letters of reference thereon, making a part of this specification, in which—

Figure 1 is a side view of a wheel and bushing, and

Figure 2 is a vertical section of the same.

To enable others to make and use my invention, I will proceed to describe its construction and operation.

The wheel, A, is constructed in any of the usual forms, with the exception of the eye, B B, in the hub or centre, which is made of an angular form, and tapering through the hub.

The bushing, C, is composed of iron, steel, glass, brass, or any of the usual substances used for similar purposes, and is of the same shape, and tapers externally as the eye of the hub of wheel into which it is driven, fitting sufficiently close, so as to be kept in its position by the friction of its sides in contact with the sides of the eye of the wheel, and prevented from turning in the hub by its angles.

The bushing, C, has an eye, D, of the proper size for the axle upon which it is intended to run.

It is well known that wheels running loose upon their axles are liable to soon become so worn in the eye as to become irregular in their motion, and consequently useless.

The advantage that I claim for my invention is this, that when the eye of the bushing becomes worn by the friction upon its axle, the bushing can be driven out and replaced by a new one, and still using the same wheel, thereby effecting a great saving, as the bushing can be made at a trifling expense when compared with cost of an entire new wheel.

What I claim as new, and wish to secure by Letters Patent, is—

The bushing C, provided with the cylindrical bore D, and having its external surface polygonal, as and for the purpose described.

THOMAS BLAKE.

Witnesses:
MELVILLE COTTLE,
W. E. GREENE.